(12) United States Patent
Kim et al.

(10) Patent No.: US 12,466,490 B2
(45) Date of Patent: Nov. 11, 2025

(54) VEHICLE BODY STRUCTURE

(71) Applicants: Hyundai Motor Company, Seoul (KR); Kia Corporation, Seoul (KR); HYUNDAI MOBIS CO., LTD., Seoul (KR)

(72) Inventors: Do Hoi Kim, Sejong-Si (KR); You Jin Park, Suwon-Si (KR); Jae Sup Byun, Seongnam-Si (KR); Jang Ho Kim, Seoul (KR)

(73) Assignees: Hyundai Motor Company, Seoul (KR); Kia Corporation, Seoul (KR); HYUNDAI MOBIS CO., LTD., Seoul (KR)

( * ) Notice: Subject to any disclaimer, the term of this patent is extended or adjusted under 35 U.S.C. 154(b) by 394 days.

(21) Appl. No.: 18/117,968

(22) Filed: Mar. 6, 2023

(65) Prior Publication Data

US 2024/0101195 A1 Mar. 28, 2024

(30) Foreign Application Priority Data

Sep. 26, 2022 (KR) .................. 10-2022-0121627

(51) Int. Cl.
| | |
|---|---|
| *B62D 25/02* | (2006.01) |
| *B60R 13/04* | (2006.01) |
| *B62D 23/00* | (2006.01) |
| *B62D 25/04* | (2006.01) |
| *B62D 27/02* | (2006.01) |
| *B62D 27/06* | (2006.01) |

(52) U.S. Cl.
CPC .............. *B62D 25/02* (2013.01); *B60R 13/04* (2013.01); *B62D 23/005* (2013.01); *B62D 25/04* (2013.01); *B62D 27/065* (2013.01)

(58) Field of Classification Search
CPC ........ B62D 25/02; B62D 25/04; B62D 25/08; B62D 27/023; B60R 13/04
USPC ............................................ 296/201, 29, 30
See application file for complete search history.

(56) References Cited

FOREIGN PATENT DOCUMENTS

| | | | | |
|---|---|---|---|---|
| CN | 109927792 A | * | 6/2019 | ............. B62D 25/00 |
| JP | H0352287 U | * | 5/1991 | ............. B62D 25/02 |
| KR | 10-2015-0104269 | | 9/2015 | |
| KR | 10-2023-0067148 | | 5/2023 | |

OTHER PUBLICATIONS

CN109927792 Text (Year: 2019).*
JPH0354487 Text (Year: 1991).*

* cited by examiner

*Primary Examiner* — Dennis H Pedder
(74) *Attorney, Agent, or Firm* — Morgan Lewis & Bockius LLP

(57) ABSTRACT

A vehicle body structure includes a roof side assembly connecting upper end portions of all pillars of a vehicle body along a front and rear direction of the vehicle body and forming an A-pillar itself; a plurality of brackets for fixing the roof side assembly to a lower vehicle body; and an external garnish coupled to an external side of the roof side assembly.

17 Claims, 13 Drawing Sheets

VEHICLE BODY STRUCTURE

CROSS REFERENCE TO RELATED APPLICATION

The present application claims priority to Korean Patent Application No. 10-2022-0121627 filed on Sep. 26, 2022, the entire contents of which is incorporated herein for all purposes by this reference.

BACKGROUND OF THE PRESENT DISCLOSURE

Field of the Present Disclosure

The present disclosure relates to a vehicle body structure.

Description of Related Art

The vehicle body of a vehicle provides a space for a passenger's living space and a space for loading cargo, secures safety in case of a vehicle collision, or the like, and has a large weight in forming the external appearance design of the vehicle.

In a conventional vehicle body, A, B, and C-pillars are sequentially disposed from the front of the vehicle body toward the rear, forming a space between both A-pillars for mounting a windshield glass, a space between the A-pillar and the B-pillar for mounting a front door, a space between the B-pillar and the C-pillar for mounting a rear door, and a space between both C-pillars for mounting a rear windshield glass, respectively, and a roof is attached to the upper sides of these A, B, and C-pillars.

The structures of the conventional A, B, and C-pillars are of a press panel type, are all connected to each other through welding, and are put into the painting process after being mounted into the entire body of the Body In White (BIW) state. Therefore, the conventional vehicle body is advantageous for mass production, but there are many required devices such as molds, so it is disadvantageous for the future mobility market of small quantity batch production.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle body structure designed to be competitive in the future mobility market of small quantity batch production by reducing the number of vehicle body parts and making it possible to easily change some components of the vehicle body.

A vehicle body structure of the present disclosure for achieving the above-mentioned object includes: a roof side assembly connecting upper end portions of all pillars of a vehicle body along a front and rear direction of the vehicle body and forming an A-pillar itself; a plurality of brackets for fixing the roof side assembly to a lower vehicle body; and an external garnish coupled to an external side of the roof side assembly.

The roof side assembly may include: a pipe formed in the front and rear direction of the vehicle body with a closed cross-section; an upper reinforcement member coupled to an upper side of the pipe long along the front and rear direction of the vehicle body; a lower reinforcement member coupled to a lower side of the pipe long along the front and rear direction of the vehicle body; and an inner reinforcement member coupled to a vehicle body internal side of the pipe long along the front and rear direction of the vehicle body.

The plurality of brackets may include: an A-pillar bracket for coupling the roof side assembly to a fender of the lower vehicle body; a B-pillar bracket for coupling the roof side assembly to an upper end portion of a B-pillar of the lower vehicle body; and a C-pillar bracket for coupling the roof side assembly to an upper end portion of a C-pillar of the lower vehicle body.

The upper reinforcement member may be coupled to and overlapped with the inner reinforcement member at the vehicle body internal side of the pipe to form an upper overlapping portion, and the lower reinforcement member may be coupled to and overlapped with the inner reinforcement member at a lower side of the pipe to form a lower overlapping portion.

In the upper overlapping portion, a plurality of overlapping portion coupling holes may be formed along a front and rear direction of a vehicle body for coupling the external garnish, and a plurality of elastic fixtures may be formed on an internal side of the external garnish for being inserted into the overlapping portion coupling holes.

The elastic fixture may be formed as a loop ring of a closed loop shape, a portion of which is integral to the internal side of the external garnish.

A plurality of pipe coupling holes may be formed in the pipe along a front and rear direction of a vehicle body for coupling the external garnish, and a fastener coupling portion for coupling a fastener inserted into the pipe coupling hole may be integrally formed on an internal side of the external garnish.

The fastener may include: a coupling hook portion coupled to a corresponding pipe coupling hole in a form of an elastic hook; and a base portion supporting the coupling hook portion, and the fastener coupling portion may include: a base portion receiving groove into which the base portion of the fastener is inserted while sliding in a longitudinal direction of the external garnish; a hook portion receiving groove communicating with the base portion receiving groove to allow a state in which the coupling hook portion protrudes toward the internal side of the external garnish in a state in which the base portion is inserted into the base portion receiving groove; and a locking portion formed in the hook portion receiving groove to prevent the fastener inserted into the hook portion receiving groove from being separated from the hook portion receiving groove.

On an external side of a vehicle body front end portion of the roof side assembly, an A-pillar reinforcement member may be mounted.

The external garnish may be coupled to the A-pillar reinforcement member by a plurality of fastening members fastened in an up and down direction, a front and rear direction, and a left and right direction thereof.

The plurality of fastening members may include: a first A-fastening bolt which is provided to penetrate from an upper side of a front end portion of the external garnish toward a lower side and is coupled to the A-pillar reinforcement member; a second A-fastening bolt which is provided to penetrate from a side of the external garnish in a left and right direction and is coupled to the A-pillar reinforcement member; and a third A-fastening bolt which is provided to penetrate from a rear of the external garnish toward a front and is coupled to the A-pillar reinforcement member.

The external garnish may be provided with a thickness reduction portion in which a lower end portion of a portion coupled with a pillar of a vehicle body gradually decreases in thickness toward a surface of the pillar to form a smooth connection portion.

The external garnish may be provided with a rear flange formed to surround a rear upper side of the C-pillar, at a rear end portion coupled to the C-pillar, and a C-fastening bolt which is provided to penetrate the rear flange from a rear toward a front and is coupled to the C-pillar may be provided.

The external garnish may be formed by connecting a plurality of garnish partial bodies to each other along the front and rear direction of the vehicle body, and the garnish partial bodies may be coupled to each other in a hook fastening manner.

A plurality of hooks may be formed on an end portion of one of the garnish partial bodies coupled to each other to protrude toward another thereof, and a plurality of hook holes to which the plurality of hooks are respectively coupled may be formed on an end portion of the other thereof.

The plurality of hooks may be integrally formed with hook claws to prevent separation after being inserted into the hook holes, and the plurality of hooks may be formed so that the respective hook claws face different directions.

The present disclosure can provide a vehicle body designed to be competitive in the future mobility market of small quantity batch production by reducing the number of vehicle body parts and making it possible to easily change some components of the vehicle body.

BRIEF DESCRIPTION OF THE DRAWINGS

FIG. 4 is a view showing when FIG. 3 is observed from an opposite side thereof.

FIG. 8 is a view showing when FIG. 7 is observed from another angle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE PRESENT DISCLOSURE

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included herein will be described in detail with reference to the accompanying drawings, in which identical or like components are provided like reference numerals regardless of drawing numbers, and description thereof will not be repeated.

Suffixes for components, "module", "unit" and "part" used in the following description, will be provided or used in place of each other taking only easiness of specification preparation into consideration, and they do not have distinguishable meanings or roles by themselves.

In describing the exemplary embodiments included herein, it is noted that the detailed description for related known arts may be omitted herein so as not to obscure essential points of the present disclosure. Furthermore, the accompanying drawings are intended to facilitate a better understanding of examples included herein, and the technical spirit included herein is not limited by the accompanying drawings, and rather should be construed as including all the modifications, equivalents and substitutes within the technical idea and technical scope of the present disclosure.

The terms including ordinal number such as, first, second and the like may be used to explain various components, but the components should not be limited by these terms. Said terms are used in order only to distinguish one component from another component.

Furthermore, when one component is referred to as being "connected" or "accessed" to another element, it should be understood that the one component may be directly connected or accessed to the other component or any intervening component may also be present therebetween. Contrarily, when one component is referred to as being "directly connected" or "directly accessed" to another component, it should be understood as that no other element is present therebetween.

Singular expressions may include the meaning of plural expressions unless the context clearly indicates otherwise.

Terms such as "include (or comprise)", "have (or be provided with)", and the like are intended to indicate that features, numbers, steps, operations, components, parts, or combinations thereof written in the following description exist, and thus should not be understood as that the possibility of existence or addition of one or more different features, numbers, steps, operations, components, parts, or combinations thereof is excluded in advance.

Additionally, a unit or a control unit included in the names of a motor control unit (MCU), a hybrid control unit (HCU), and the like is only a term widely used in the naming of a controller that controls a specific vehicle function. However, it does not mean a generic function unit.

A controller may include is a communication apparatus that communicates with other controllers or sensors to control the functions which it is responsible for, a memory that stores operating system or logic instructions, input/output information, and the like, and one or more processors that perform judgments, calculations, decisions, and the like necessary to control the functions which it is responsible for.

Referring to FIGS. 1 to 18, an exemplary embodiment of a vehicle body structure of the present disclosure includes a roof side assembly 3 connecting the upper end portions of all pillars of the vehicle body 1 along the front and rear direction of the vehicle body 1 and forming the A-pillar itself; a plurality of brackets for fixing the roof side assembly 3 to a lower vehicle body 5; and an external garnish 7 coupled to the external side of the roof side assembly 3.

That is, in an exemplary embodiment of the present disclosure, the vehicle body may include the lower vehicle body 5 and an upper vehicle body, wherein the upper vehicle body may include the roof side assembly 3 and the external garnish 7.

Figure 1:
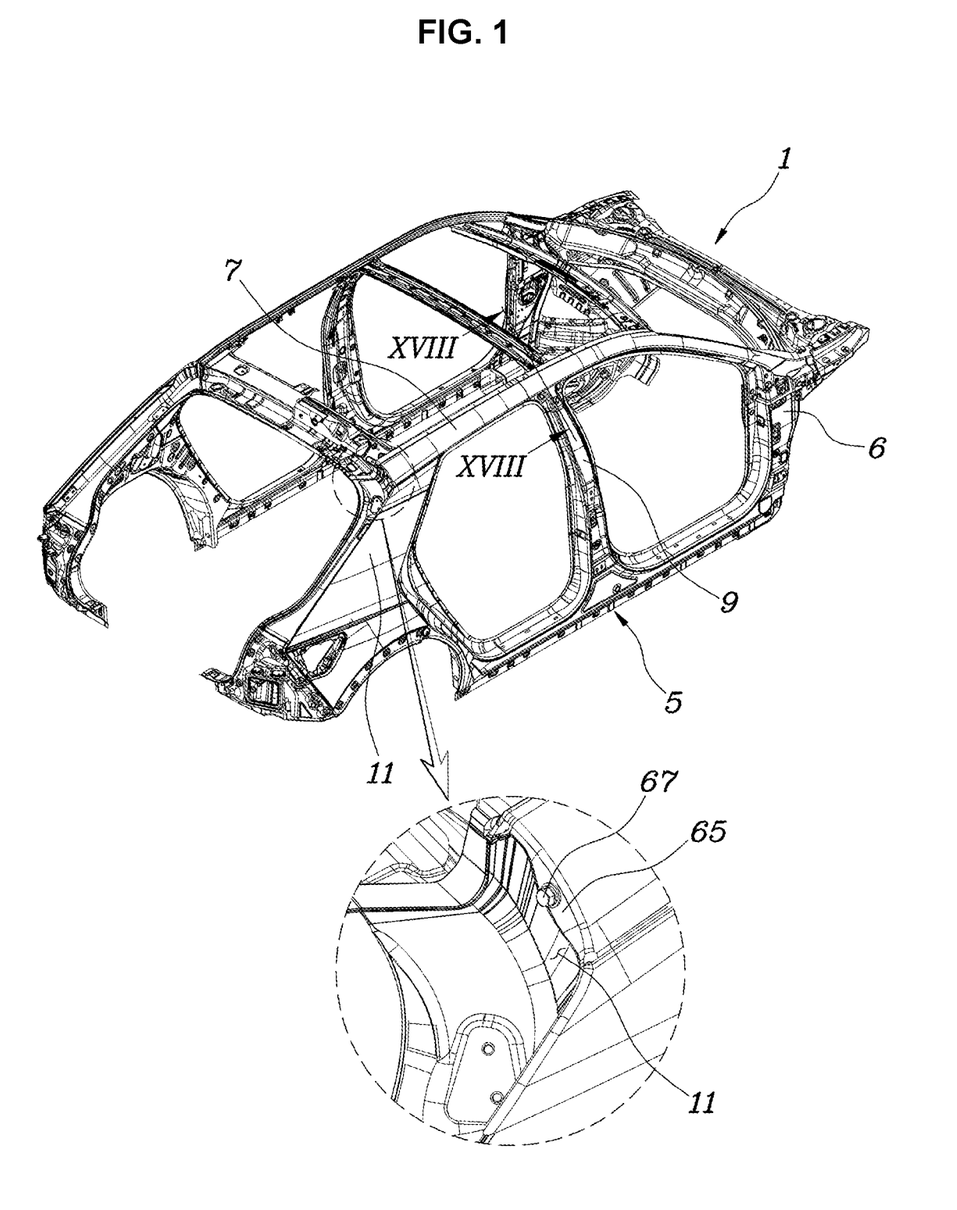
FIG. 1 is a view showing a vehicle body structure according to an exemplary embodiment of the present disclosure.
Figure 2:
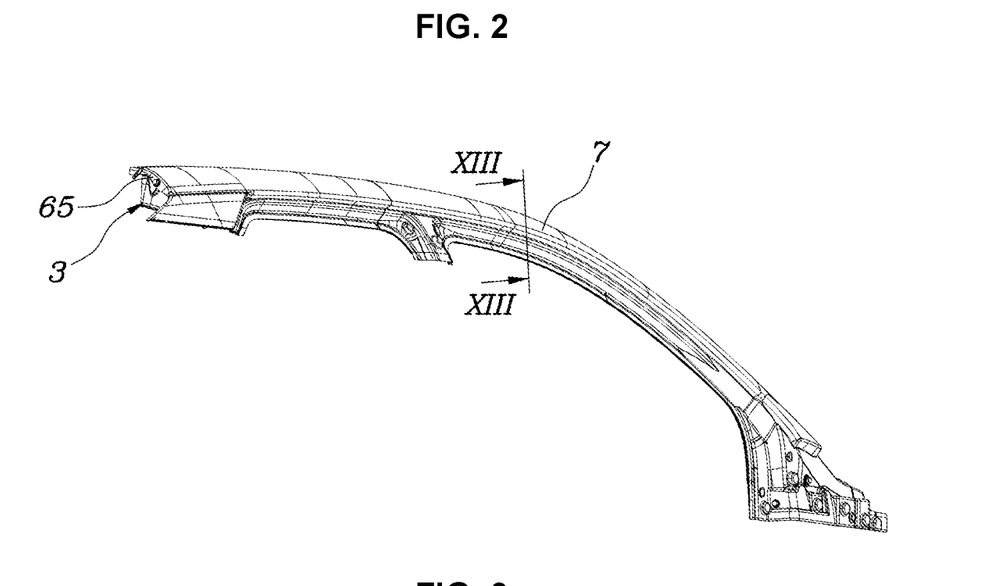
FIG. 2 is a view showing the roof side assembly and the external garnish of FIG.

For example, in the vehicle body as shown in FIG. 1, a B-pillar 9, a C-pillar 11 and the like of the lower side are elements forming the lower vehicle body 5, and by providing such lower vehicle body 5 in common, and by combining the roof side assembly 3 and the external garnish 7 according to an exemplary embodiment of the present disclosure to the upper side of the lower vehicle body 5 while varying them according to the vehicle model, it is possible to flexibly respond to the future mobility market of small quantity batch production.

Furthermore, by changing all of the structure of the lower vehicle body 5, and the roof side assembly 3 and the external garnish 7 of the present disclosure forming the upper vehicle body, a more flexible body structure will be possible.

For reference, in the present exemplary embodiment of the present disclosure, although the vehicle body including up to the C-pillar 11 is illustrated, the present disclosure can also be applied to a vehicle including a D-pillar employed in an SUV (Sports Utility Vehicle) and the like. In such case, the roof side assembly 3 and the external garnish 7 of the present disclosure may be configured to be connected to the upper end portion of the D-pillar.

Figure 5:
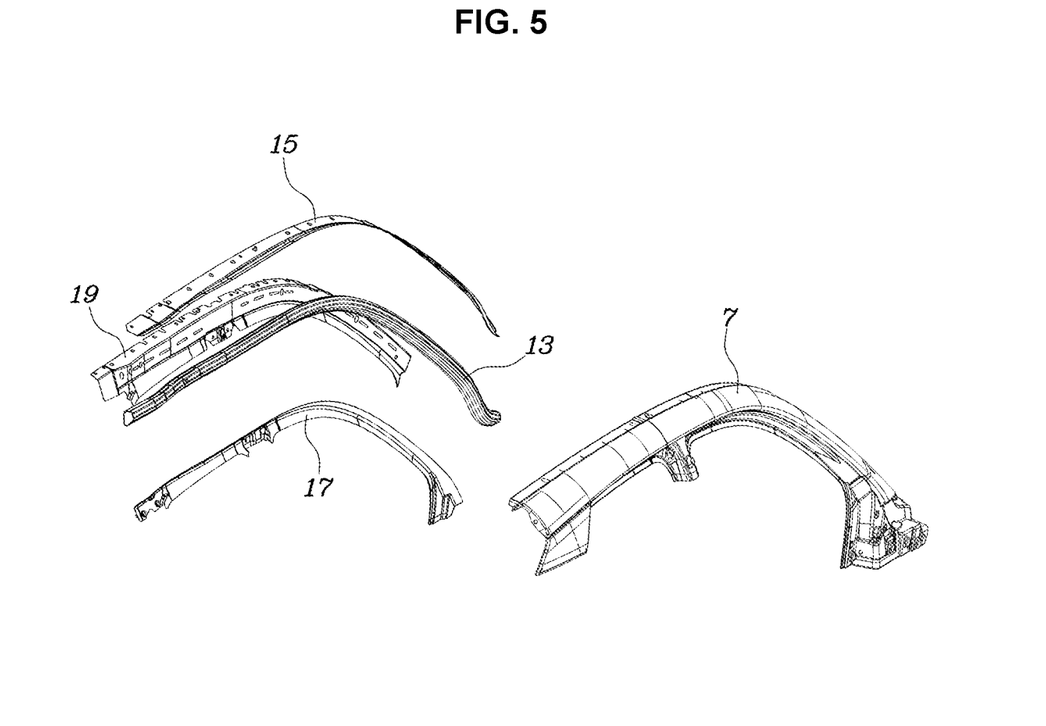
FIG. 5 is a further exploded view of the roof side assembly of FIG. 3.

In the present exemplary embodiment of the present disclosure, the roof side assembly 3 includes a pipe 13 formed long in the front and rear direction of the vehicle body with a closed cross-section; an upper reinforcement member 15 coupled to the upper side of the pipe 13 long along the front and rear direction of the vehicle body; a lower reinforcement member 17 coupled to the lower side of the pipe 13 long along the front and rear direction of the vehicle body; and an inner reinforcement member 19 coupled to the vehicle body internal side of the pipe 13 long along the front and rear direction of the vehicle body.

That is, in the roof side assembly 3, with respect to the pipe 13, the upper reinforcement member 15 is coupled to the upper side, the lower reinforcement member 17 is coupled to the lower side, and the inner reinforcement member 19 is coupled to the internal side of the vehicle body, so that the upper reinforcement member 15, the lower reinforcement member 17, and the inner reinforcement member 19 extend long in the front and rear direction of the vehicle body while surrounding the pipe 13.

Figure 6:
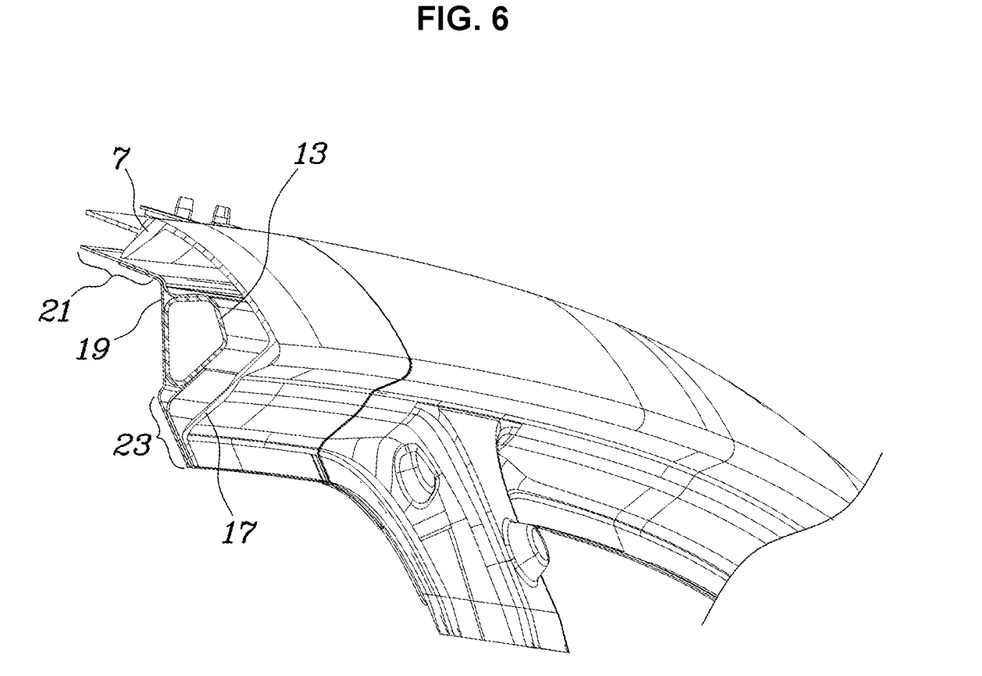
FIG. 6 is a view showing a state in which the middle portion of the roof side assembly and the external garnish of FIG. 2 is cut.

Here, the upper reinforcement member 15 is coupled to and overlapped with the inner reinforcement member 19 inside the vehicle body of the pipe 13 to form an upper overlapping portion 21, and the lower reinforcement member 17 is coupled to and overlapped with the inner reinforcement member 19 at the lower side of the pipe 13 to form a lower overlapping portion 23.

Accordingly, the roof side assembly 3 can secure stronger rigidity together with the pipe 13 by the upper overlapping portion 21 and the lower overlapping portion 23.

For reference, the upper reinforcement member 15, the lower reinforcement member 17, and the inner reinforcement member 19 are coupled with the pipe 13 by the welding or the like.

Figure 3:
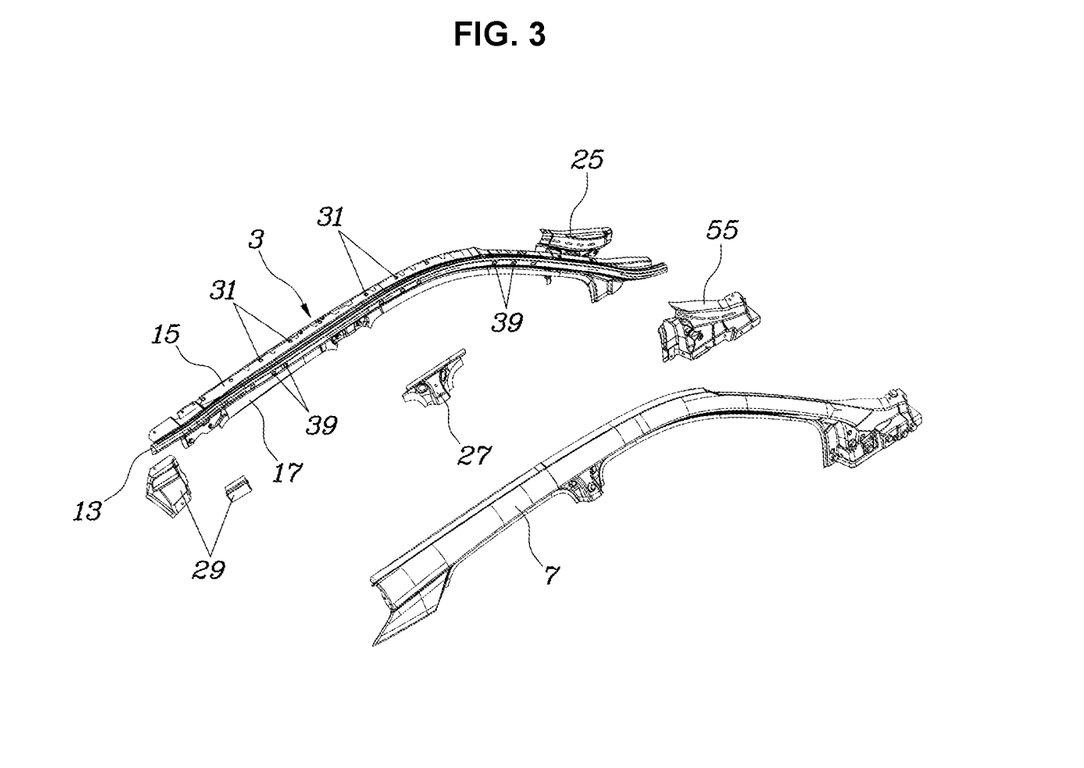
FIG. 3 is an exploded view of the roof side assembly and the external garnish of FIG. 2.
Figure 4:
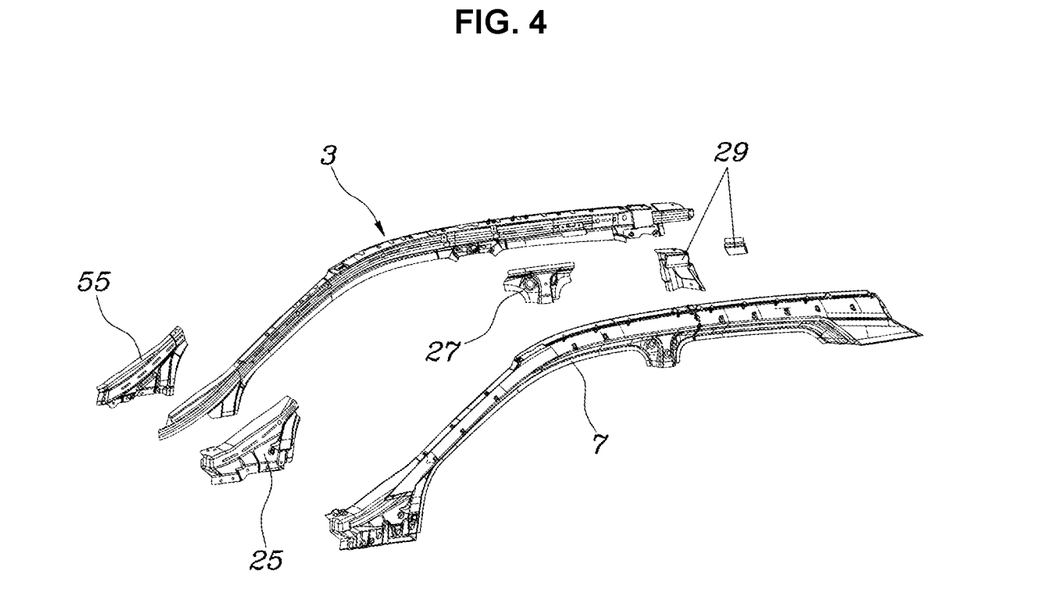

In the present exemplary embodiment of the present disclosure, the plurality of brackets include: an A-pillar bracket 25 for coupling the roof side assembly 3 to a fender 6 of the lower vehicle body 5; a B-pillar bracket 27 for coupling the roof side assembly 3 to the upper end portion of the B-pillar 9 of the lower vehicle body 5; and a C-pillar bracket 29 for coupling the roof side assembly 3 to the upper end portion of the C-pillar 11 of the lower vehicle body 5.

Here, the A-pillar bracket 25, the B-pillar bracket 27, and the C-pillar bracket 29 may be coupled to the roof side assembly 3 by the welding or the like.

Meanwhile, in coupling the A-pillar bracket 25, the B-pillar bracket 27, and the C-pillar bracket 29 with the lower vehicle body 5, it is preferable to make them more suitable for the small quantity batch production of smart factories by configuring them so that the coupling may be performed therebetween by the bolt fastening or the like.

Of course, besides the above-described brackets, other necessary brackets may be further provided to couple the roof side assembly 3 to the lower vehicle body 5.

In the upper overlapping portion 21, a plurality of overlapping portion coupling holes 31 are formed along the front and rear direction of the vehicle body for coupling the external garnish 7, and a plurality of elastic fixtures are formed on the internal side of the external garnish 7 for being inserted into the overlapping portion coupling holes 31.

That is, when the plurality of elastic fixtures provided in the external garnish 7 are inserted into the overlapping portion coupling holes 31, the elastic fixtures are elastically deformed and inserted into the overlapping portion coupling holes 31, so that the external garnish 7 is fixed to the upper overlapping portion 21.

Figure 9:
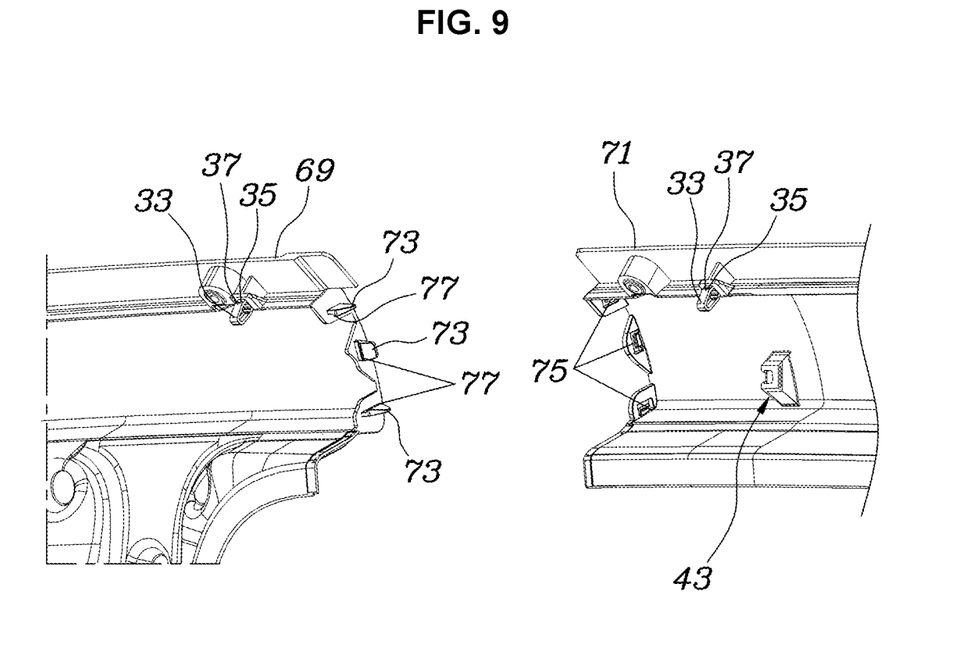
FIG. 9 is an enlarged view of portion IX of FIG. 7.

In the present exemplary embodiment of the present disclosure, the elastic fixture is formed as a loop ring 33 of a closed loop shape, a portion of which is integral to the internal side of the external garnish 7.

As shown, the loop ring 33 has a recessed portion 35 formed at a region protruding from the external garnish 7, and is formed in a shape that becomes narrower in width from the convex portion 37 forming the recessed portion 35 toward its tip portion, so that the insertion into the overlapping portion coupling hole 31 may be made easily, and once the insertion is completed, it is possible to maintain the state in which the external garnish 7 is securely fixed to the upper overlapping portion 21 by the structure of the recessed portion 35 and the convex portion 37.

Figure 10:
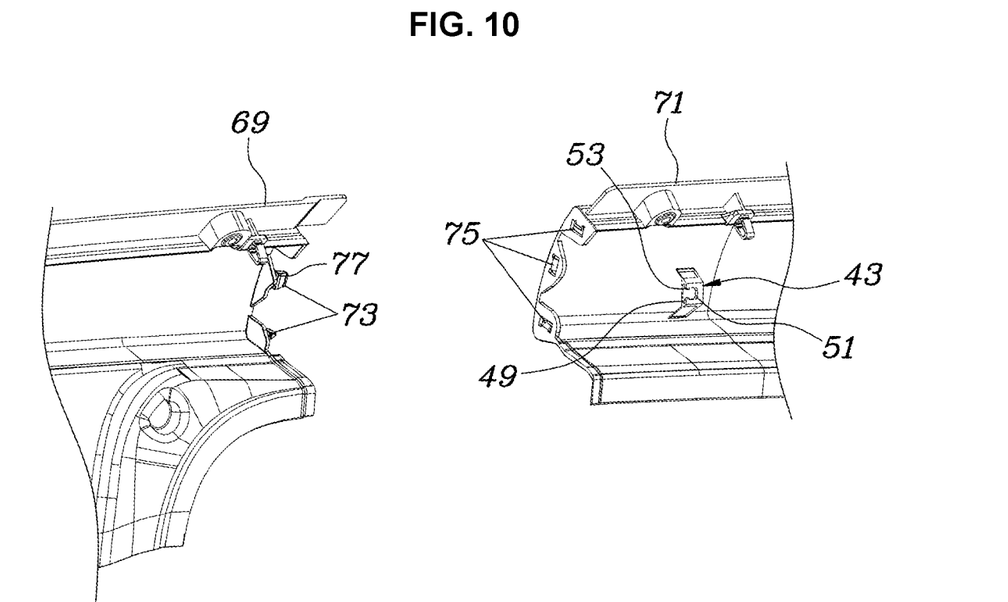
FIG. 10 is an enlarged view of portion X of FIG. 8.

A plurality of pipe coupling holes 39 are formed in the pipe 13 along the front and rear direction of the vehicle body 1 for coupling the external garnish 7, and a fastener coupling portion 43 for coupling a fastener 41 inserted into the pipe coupling hole 39 is integrally formed on the internal side of the external garnish 7.

Figure 12:
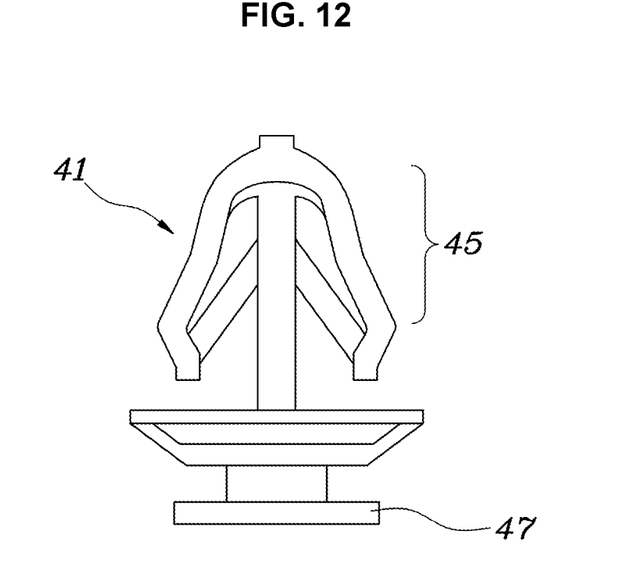
FIG. 12 is a view exemplarily illustrating a fastener.

Here, the fastener 41 includes a coupling hook portion 45 coupled to the pipe coupling hole 39 in a form of an elastic hook; and a base portion 47 supporting the coupling hook portion 45.

Furthermore, the fastener coupling portion 43 includes a base portion receiving groove 49 into which the base portion 47 of the fastener 41 is inserted while sliding in the longitudinal direction of the external garnish 7, a hook portion receiving groove 51 communicating with the base portion receiving groove 49 to allow a state in which the coupling hook portion 45 protrudes toward the internal side of the external garnish 7 in a state in which the base portion 47 is inserted into the base portion receiving groove 49, and a locking portion 53 formed in the hook portion receiving groove 51 to prevent the fastener 41 inserted into the hook portion receiving groove 51 from being separated from the hook portion receiving groove 51.

Therefore, in a state in which the coupling hook portion 45 is mounted to be inserted into the hook portion receiving groove 51 by inserting the base portion 47 of the fastener 41 into the base portion receiving groove 49, the fastener 41 is not easily separated from the fastener coupling portion 43 by the locking portion 53.

Figure 13:
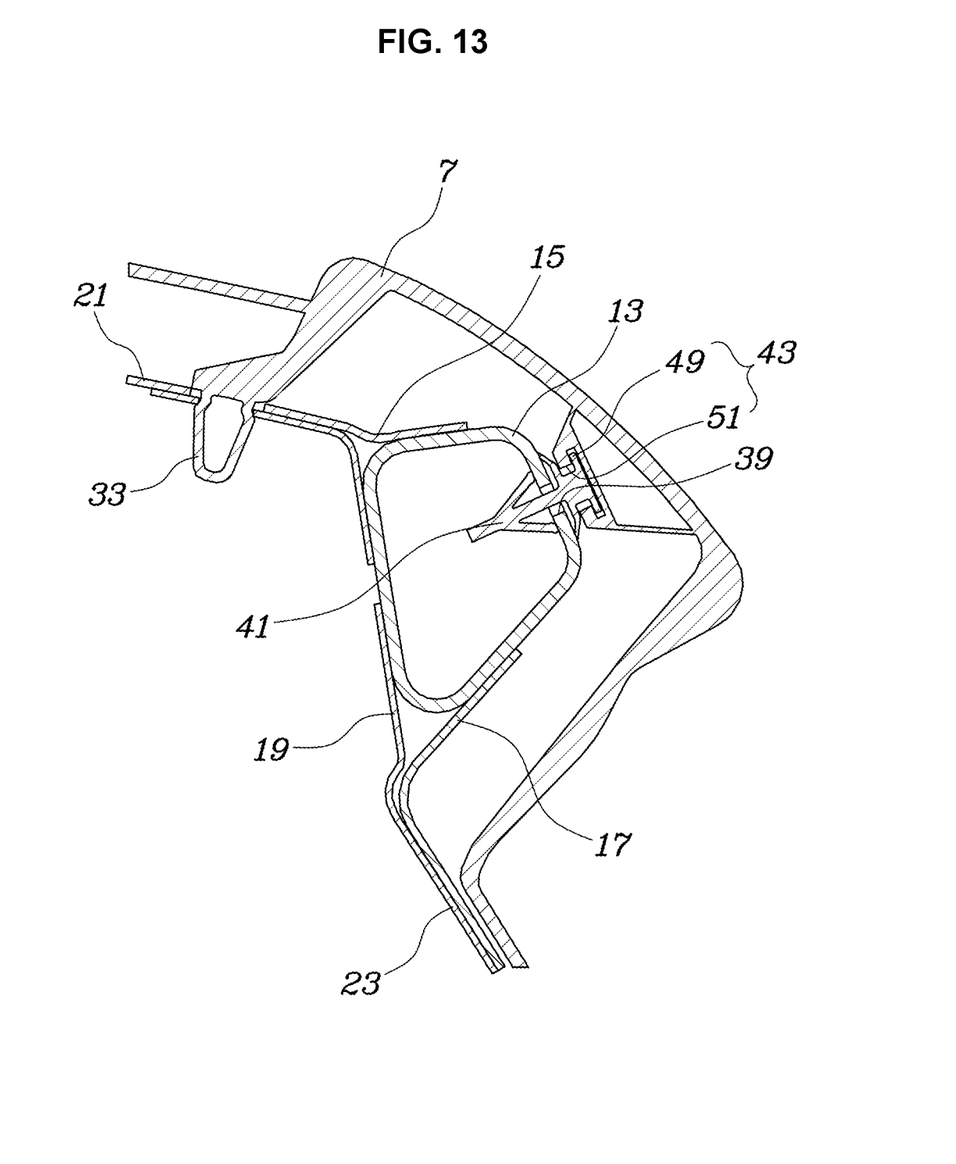
FIG. 13 is a cross-sectional view taken along line XIII-XIII of FIG. 2.

Furthermore, when the external garnish 7 is pressed toward the pipe 13 with the fastener 41 coupled to the fastener coupling portion 43, so that the coupling hook portion 45 is inserted into the pipe coupling hole 39, the coupling hook portion 45 of the fastener 41 is elastically deformed and coupled through the pipe coupling hole 39, firmly securing the coupling between the external garnish 7 and the pipe 13.

Figure 14:
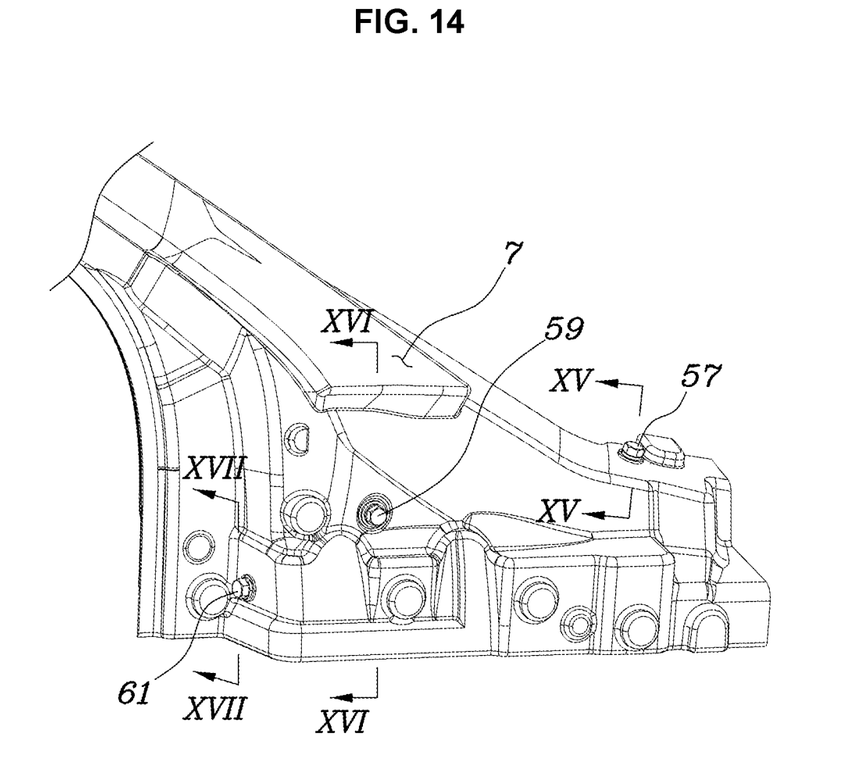
FIG. 14 is a view showing a front end portion of the external garnish.

On the external side of the vehicle body front end portion of the roof side assembly 3, an A-pillar reinforcement member 55 is mounted.

The external garnish 7 is coupled to the A-pillar reinforcement member 55 by a plurality of fastening members fastened in the up and down direction, the front and rear direction, and the left and right direction thereof.

Accordingly, the external garnish 7 can form a very close coupling state with the A-pillar reinforcement member 55.

Figure 15:
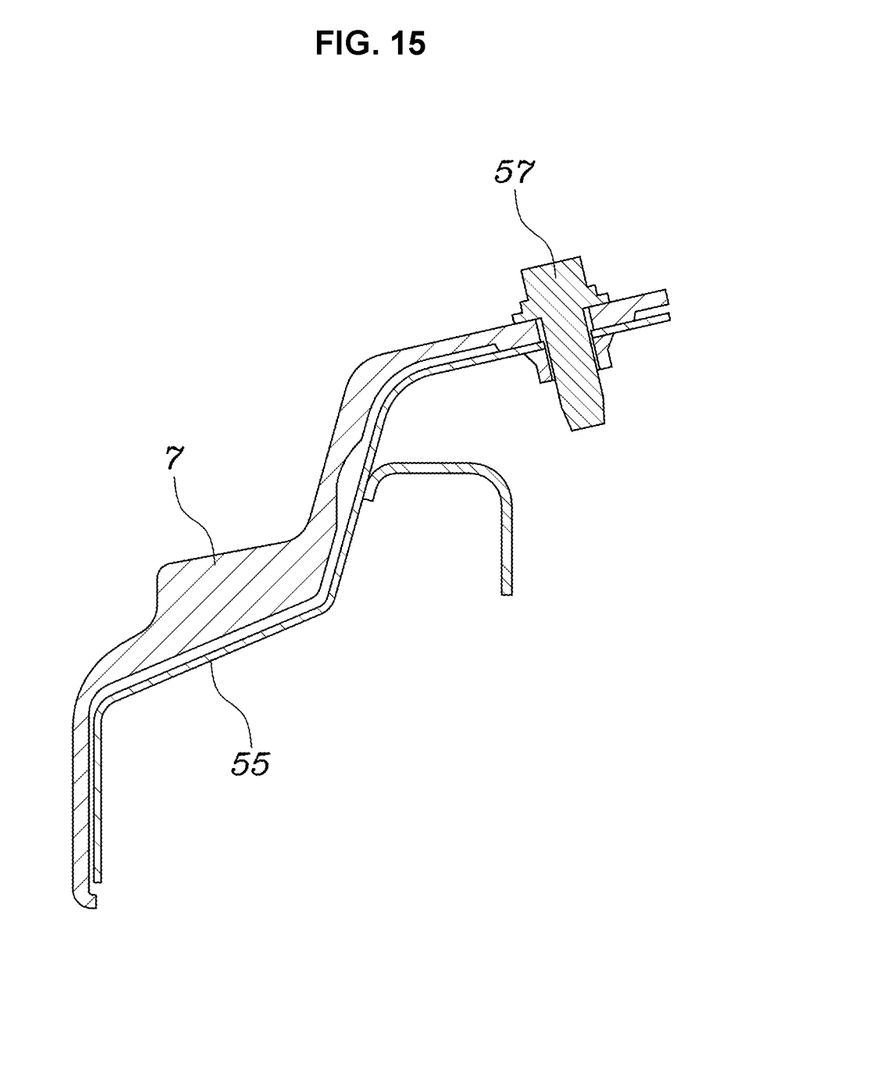
FIG. 15 is a cross-sectional view taken along line XV-XV of FIG. 14.
Figure 16:
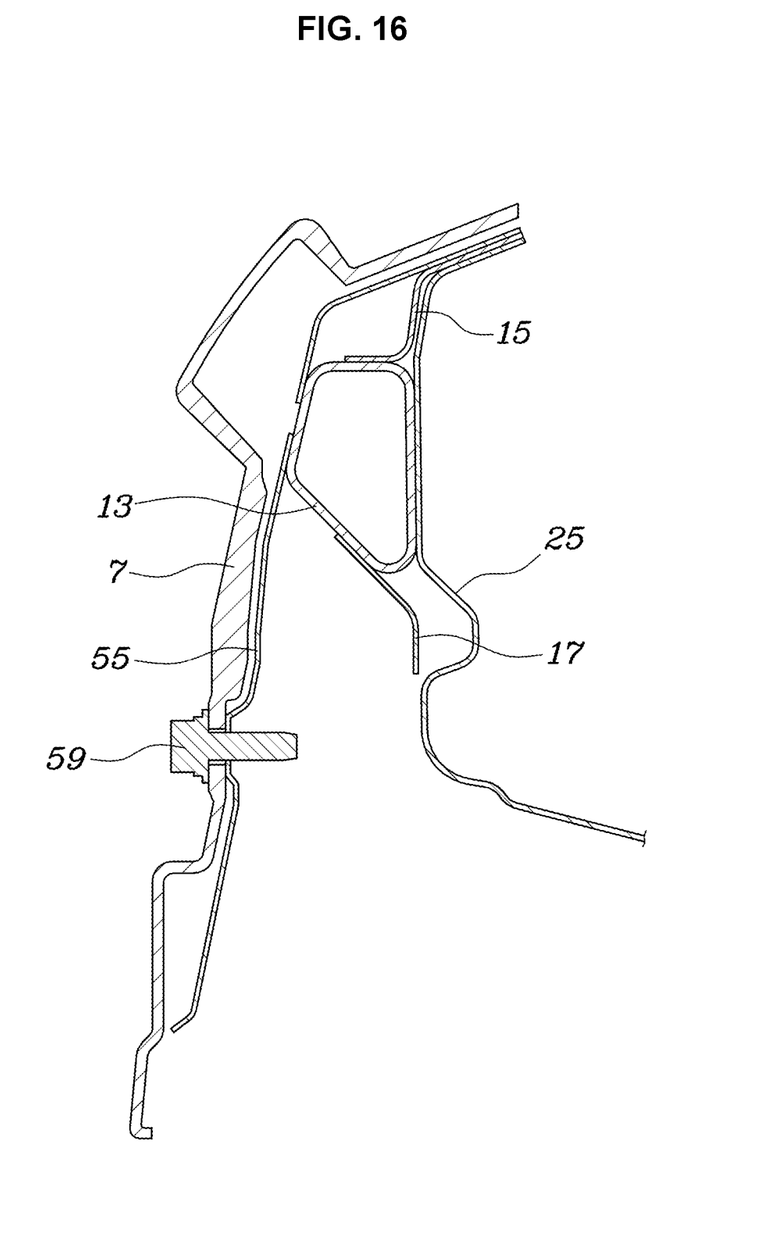
FIG. 16 is a cross-sectional view taken along line XVI-XVI of FIG. 14.
Figure 17:
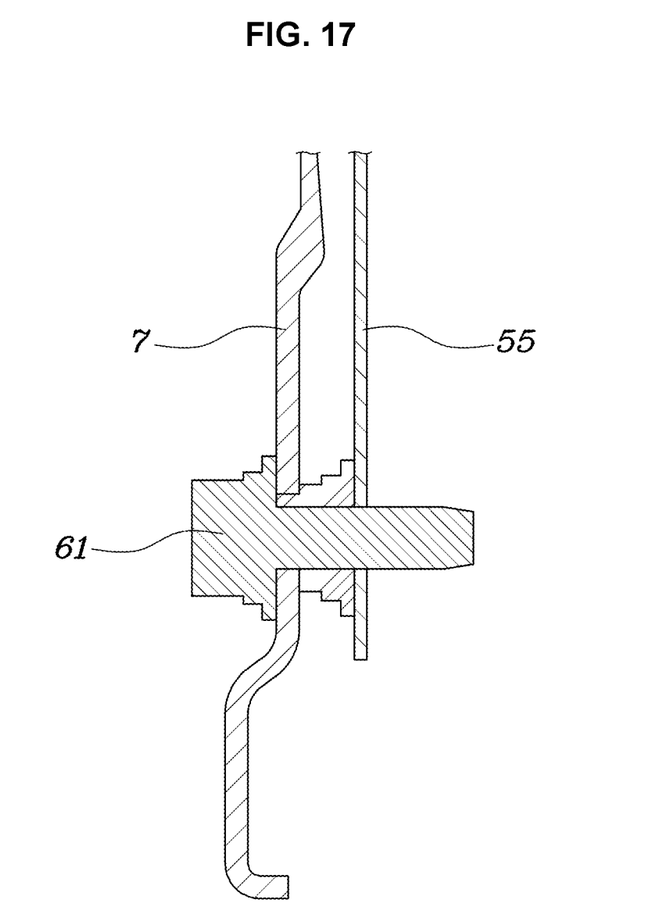
FIG. 17 is a cross-sectional view taken along line XVII-XVII of FIG. 14.

Here, the plurality of fastening members include: a first A-fastening bolt 57 which is provided to penetrate from the upper side of the front end portion of the external garnish 7 toward the lower side and is coupled to the A-pillar reinforcement member 55; a second A-fastening bolt 59 which is provided to penetrate from the side of the external garnish 7 in the left and right direction and is coupled to the A-pillar reinforcement member 55; a third A-fastening bolt 61 which is provided to penetrate from the rear of the external garnish 7 toward the front and is coupled to the A-pillar reinforcement member 55.

Ideally, it would be desirable that the first A-fastening bolt 57, the second A-fastening bolt 59, and the third A-fastening bolt 61 are fastened in directions orthogonal to each other, so that the external garnish 7 and the A-pillar reinforcement member 55 may be mutually constrained in all directions in space, and the configuration of the present disclosure as described above means that, within a practical range, the first A-fastening bolt 57, the second A-fastening bolt 59, and the third A-fastening bolt 61 are fastened while being orthogonal to each other.

Figure 18:
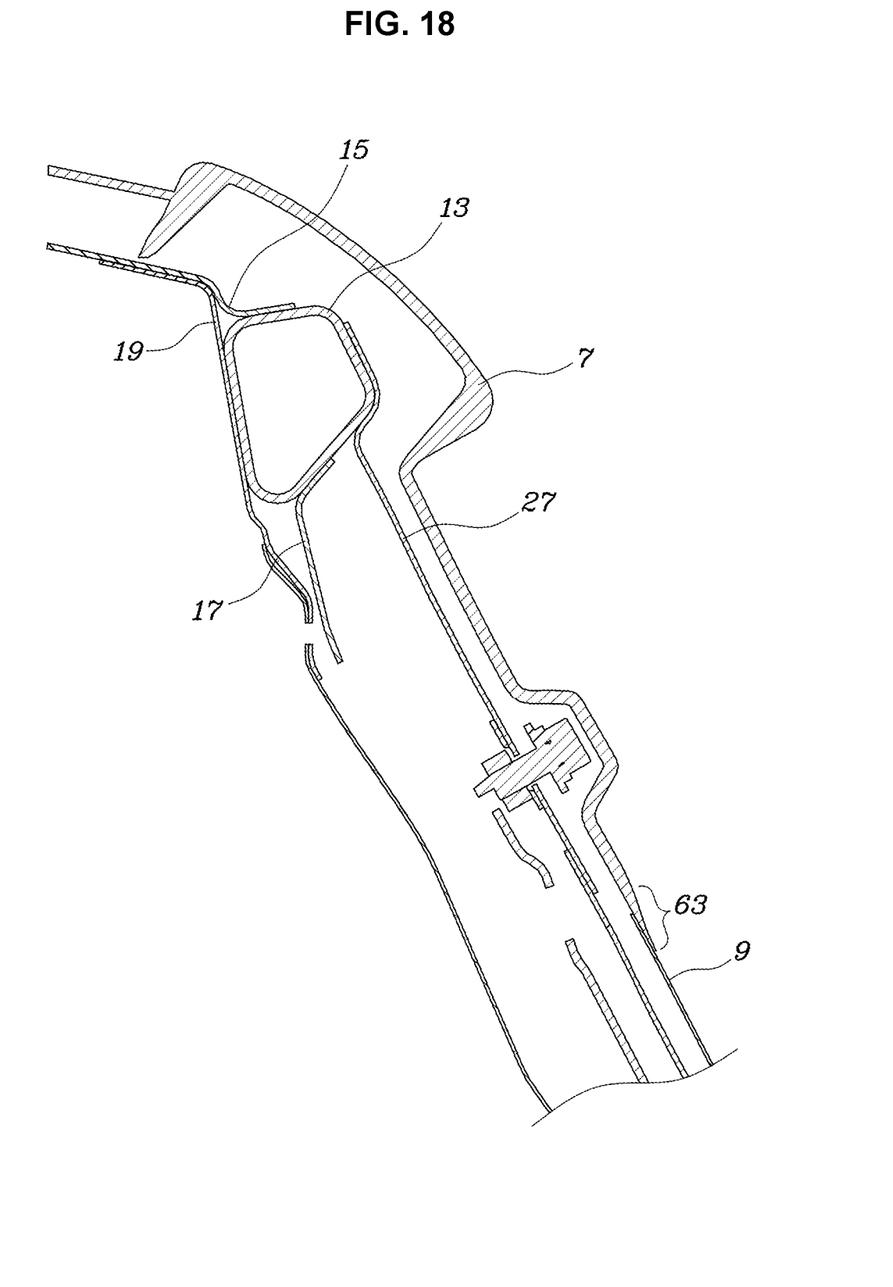
FIG. 18 is a cross-sectional view taken along line XVIII-XVIII of FIG. 1.

The external garnish 7 is provided with a thickness reduction portion 63 in which the lower end portion of the portion coupled with the pillar of the vehicle body 1 gradually decreases in thickness toward the surface of the pillar to form a smooth connection portion.

Accordingly, a smooth connection portion is formed without a remarkable difference of level at the portion where the external garnish 7 meets the external surface of the pillar, contributing to the improvement of the appearance of the body.

For reference, in the present exemplary embodiment of the present disclosure, a portion where the external garnish 7 is combined with the B-pillar 9 is illustrated.

The external garnish 7 is provided with a rear flange 65 formed to surround the rear upper side of the C-pillar 11, at the rear end portion coupled to the C-pillar 11, and a C-fastening bolt 67 which is provided to penetrate the rear flange 65 from the rear toward the front and is coupled to the C-pillar 11 is provided.

That is, in a state in which the rear flange 65 is formed at the rear end portion of the external garnish 7, it is configured to be coupled by the C-fastening bolt 67 while surrounding the upper end portion of the rearmost pillar of the vehicle.

Therefore, the external garnish 7 can form a beautiful finish state with the upper end portion of the C-pillar 11, and secure a robust coupling state.

Meanwhile, the external garnish 7 may be formed by connecting a plurality of garnish partial bodies along the front and rear direction of the vehicle body, and the garnish partial bodies may be coupled to each other in a hook fastening manner.

Figure 7:
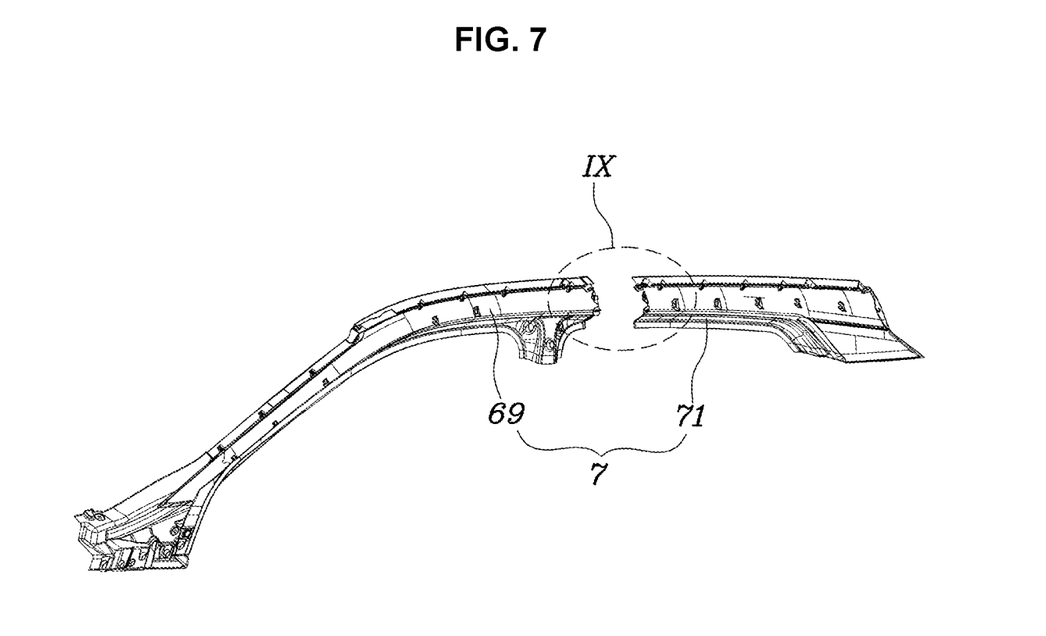
FIG. 7 is a view showing the internal surface of the external garnish.
Figure 8:
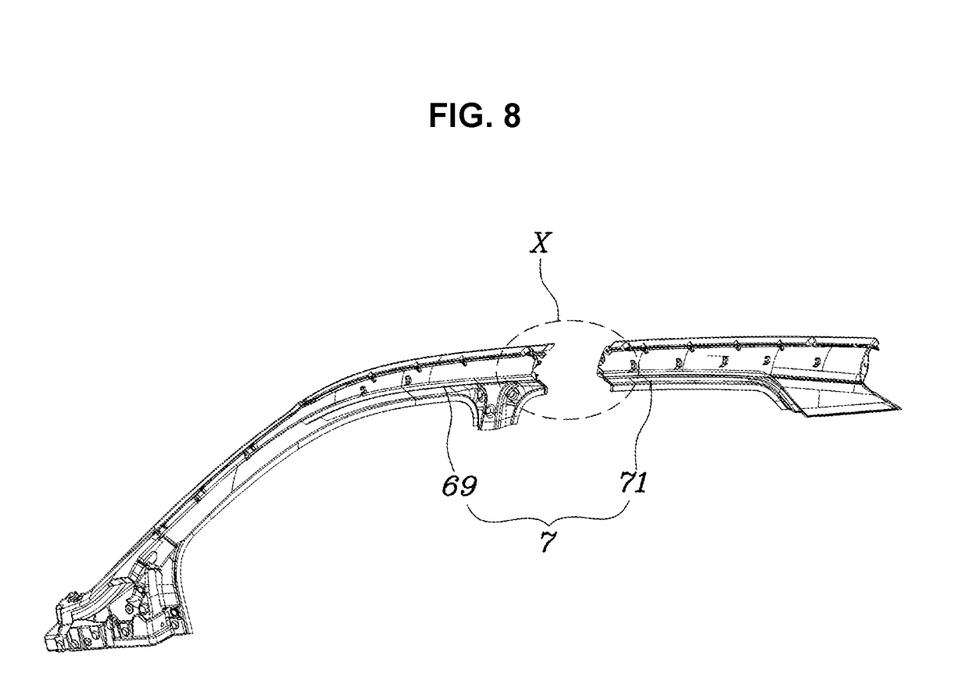

That is, the external garnish 7 may be constituted as an injection product of plastic resin, and is not integrally formed long along the front and rear direction of the vehicle body, but as shown, a front garnish portion 69 and a rear garnish portion 71 are molded separately, and combined to each other by the hook fastening method to become one body.

Figure 11:
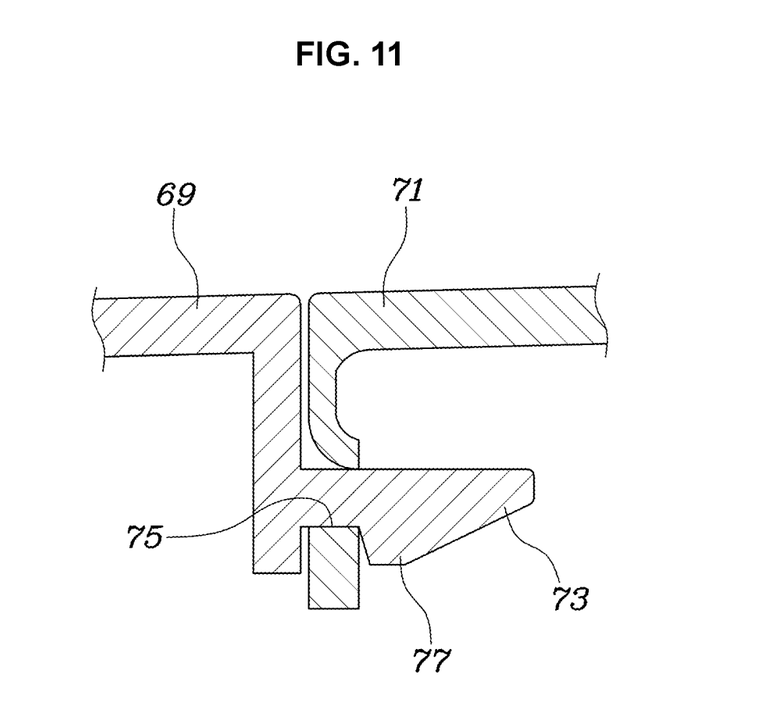
FIG. 11 is a cross-sectional view of a coupling portion of a front garnish partial body and a rear garnish partial body.

A plurality of hooks 73 are formed on the end portion of one of the garnish partial bodies coupled to each other to protrude toward another thereof, and a plurality of hook holes 75 to which the plurality of hooks 73 are respectively coupled are formed on the end portion of another thereof.

For example, in an exemplary embodiment of the present disclosure, the plurality of hooks 73 are provided in the front garnish partial body 69, and the plurality of hook holes 75 are formed in the rear garnish partial body 71.

Therefore, when the hooks 73 of the front garnish partial body 69 are inserted into and coupled with the hook holes 75 of the rear garnish partial body 71, the front garnish partial body 69 and the rear garnish partial body 71 are integrated with each other to form the external garnish 7.

The plurality of hooks 73 are integrally formed with hook claws 77 to prevent separation after being inserted into the hook holes 75, and the plurality of hooks 73 are formed so that the respective hook claws 77 face different directions as shown, so that once the plurality of hooks 73 are inserted into the hook holes 75, a more robust coupling state is maintained and cannot be easily separated as the directions elastically supported by the plurality of hooks 73 are different from each other.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle body structure comprising:
   a roof side assembly connecting upper end portions of pillars of a vehicle body along a front and rear direction of the vehicle body and forming an A-pillar itself,
   a plurality of brackets fixing the roof side assembly to a lower vehicle body; and
   an external garnish coupled to an external side of the roof side assembly.

2. The vehicle body structure of claim 1, wherein the roof side assembly includes:
   a pipe formed in the front and rear direction of the vehicle body with a closed cross-section;
   an upper reinforcement member coupled to an upper side of the pipe long along the front and rear direction of the vehicle body;
   a lower reinforcement member coupled to a lower side of the pipe long along the front and rear direction of the vehicle body; and
   an inner reinforcement member coupled to a vehicle body internal side of the pipe long along the front and rear direction of the vehicle body.

3. The vehicle body structure of claim 2,
   wherein the pillars of the vehicle body include a B-pillar and a C-pillar, and
   wherein the plurality of brackets includes:
      an A-pillar bracket for coupling the roof side assembly to a hinge pillar of the lower vehicle body;
      a B-pillar bracket for coupling the roof side assembly to an upper end portion of the B-pillar of the lower vehicle body; and
      a C-pillar bracket for coupling the roof side assembly to an upper end portion of the C-pillar of the lower vehicle body.

4. The vehicle body structure of claim 2,
   wherein the upper reinforcement member is coupled to and overlapped with the inner reinforcement member at the vehicle body internal side of the pipe to form an upper overlapping portion, and
   wherein the lower reinforcement member is coupled to and overlapped with the inner reinforcement member at a lower side of the pipe to form a lower overlapping portion.

5. The vehicle body structure of claim 4,
   wherein in the upper overlapping portion, a plurality of overlapping portion coupling holes are formed along the front and rear direction of the vehicle body for coupling the external garnish, and
   wherein a plurality of elastic fixtures are formed on an internal side of the external garnish for being inserted into the overlapping portion coupling holes.

6. The vehicle body structure of claim 5, wherein each of the elastic fixtures is formed as a loop ring of a closed loop shape, a portion of which is integral to the internal side of the external garnish.

7. The vehicle body structure of claim 4,
   wherein a plurality of pipe coupling holes are formed in the pipe along the front and rear direction of the vehicle body for coupling the external garnish, and
   wherein a fastener coupling portion for coupling a fastener inserted into a corresponding pipe coupling hole is integrally formed on an internal side of the external garnish.

8. The vehicle body structure of claim 7,
   wherein the fastener includes:
      a coupling hook portion coupled to the corresponding pipe coupling hole in a form of an elastic hook; and
      a base portion supporting the coupling hook portion,
   and wherein the fastener coupling portion includes:
      a base portion receiving groove into which the base portion of the fastener is inserted while sliding in a longitudinal direction of the external garnish;
      a hook portion receiving groove communicating with the base portion receiving groove to allow a state in which the coupling hook portion protrudes toward the internal side of the external garnish in a state in which the base portion is inserted into the base portion receiving groove.

9. The vehicle body structure of claim 8, wherein the fastener coupling portion further includes a locking portion formed in the hook portion receiving groove to prevent the fastener inserted into the hook portion receiving groove from being separated from the hook portion receiving groove.

10. The vehicle body structure of claim 3, wherein on an external side of a vehicle body front end portion of the roof side assembly, an A-pillar reinforcement member is mounted.

11. The vehicle body structure of claim 10, wherein the external garnish is coupled to the A-pillar reinforcement member by a plurality of fastening members fastened in an up and down direction, a front and rear direction, and a left and right direction.

12. The vehicle body structure of claim 11, wherein the plurality of fastening members include:
   a first A-fastening bolt which is provided to penetrate from an upper side of a front end portion of the external garnish toward a lower side thereof and is coupled to the A-pillar reinforcement member;
   a second A-fastening bolt which is provided to penetrate from a side of the external garnish in a left and right direction and is coupled to the A-pillar reinforcement member; and a third A-fastening bolt which is provided to penetrate from a rear of the external garnish toward a front thereof and is coupled to the A-pillar reinforcement member.

13. The vehicle body structure of claim 3, wherein the external garnish is provided with a thickness reduction portion in which a lower end portion of a portion coupled with a pillar of the vehicle body decreases in thickness toward a surface of the pillar so as to form a smooth connection portion.

14. The vehicle body structure of claim 3,
wherein the external garnish is provided with a rear flange formed to surround a rear upper side of the C-pillar, at a rear end portion coupled to the C-pillar, and
wherein a C-fastening bolt which is provided to penetrate the rear flange from a rear toward a front thereof and is coupled to the C-pillar is provided.

15. The vehicle body structure of claim 1,
wherein the external garnish is formed by connecting a plurality of garnish partial bodies to each other along the front and rear direction of the vehicle body.

16. The vehicle body structure of claim 15, wherein a plurality of hooks are formed on an end portion of one of the garnish partial bodies coupled to each other to protrude toward another thereof, and a plurality of hook holes to which the plurality of hooks are respectively coupled are formed on an end portion of another.

17. The vehicle body structure of claim 16,
wherein the plurality of hooks are integrally formed with hook claws to prevent separation after being inserted into the hook holes, and
wherein the plurality of hooks are formed so that respective hook claws face different directions.

* * * * *